Aug. 4, 1931.                A. N. SPANEL                1,817,533
                       TREATING MEANS FOR FABRICS
                        Filed June 11, 1928         2 Sheets-Sheet 1

INVENTOR
Abraham N. Spanel
By J. W. M. Ellis
ATTORNEY

Patented Aug. 4, 1931

1,817,533

UNITED STATES PATENT OFFICE

ABRAHAM N. SPANEL, OF ROCHESTER, NEW YORK

TREATING MEANS FOR FABRICS

Application filed June 11, 1928. Serial No. 284,469.

My invention relates in particular to means "for moth-proofing, fumigating and disinfecting blankets, woolens, fabrics, pillows, wearing apparel, mattresses, overstuffed furniture, and the like, to rid the same of insects, vermin and germ life.

It is well known to those skilled in the art that to successfully moth-proof or fumigate, it is necessary that the articles be placed within a sealed chest or closet which also contains the moth-proofing or fumigating insecticide. Such a method is, however, very slow.

The principal object of my invention has been to provide an apparatus whereby articles may be thoroughly and efficiently moth-proofed or fumigated in a very convenient manner, and in a comparatively short time by continuously passing over, around, and through the articles air which is charged with the insecticide being used.

Another object has been to provide means for carrying out the invention in an enclosed space or passageway whereby the odors or fumes of such insecticides which are disagreeable or relatively dangerous are confined, thereby permitting the use of the apparatus in the home with relative safety.

Another object has been to provide means for treating which shall be very economical in the use of the insecticide, since the fume, vapor, or gas laden air is recirculated within the closed passageway or container and is not dissipated into the atmosphere.

Moreover, the amount of air in circulation in my system may be reduced to a minimum before the treatment is started, whereby the maximum saturation of the air may be brought about very economically.

Moreover, the air used in my apparatus is quickly saturated with the fumes, vapors, or gases of the insecticide by means of the repeated passage of the air over the insecticide.

Furthermore, my invention is adapted not only to household use but to industrial use as well.

The above objects and advantages have been accomplished by the devices shown in the accompanying drawings.

Figure 1:
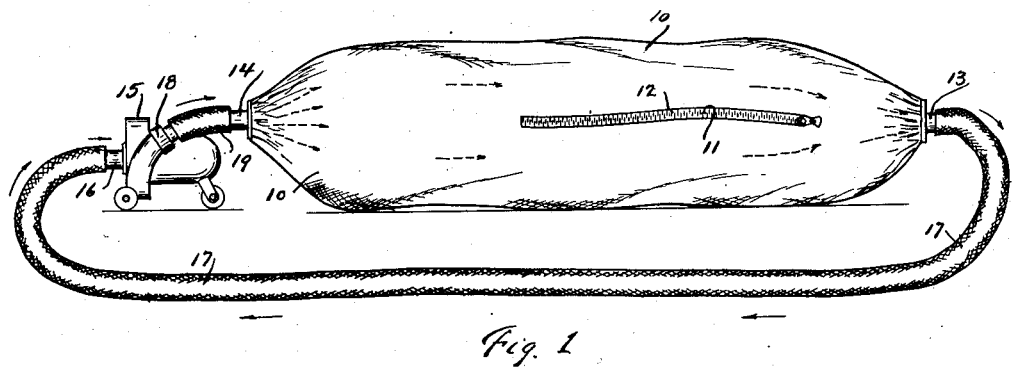
Fig. 1 shows a side elevation of one form of the complete apparatus for carrying out my invention.

As shown in Fig. 1, my apparatus comprises in general a flexible container 10 made of fabric. The fabric employed in the construction of the container is of close weave and is preferably impervious to the passage of air, such as rubberized or similarly treated fabric. The container is provided with an opening 11 somewhere in its walls which is large enough to accommodate articles which are to be placed within the container for treatment. The opening is closed preferably by means of a hookless fastener 12. The container is provided with connectors 13 and 14 arranged preferably at opposite ends of the container. A suction producing device, such as a household vacuum cleaner 15 is used in connection with the container. As shown in Fig. 1, the suction side 16 of the vacuum cleaner is attached by means of an attachment hose 17 to the connector 13 of the container. The discharge side 18 of the vacuum cleaner is attached to the connector 14 of the container by means of a piece of hose 19.

When the apparatus shown in Fig. 1 is put in use, the articles to be treated are placed within the container through the opening 11 which opening is then closed, and the vacuum cleaner 15 connected as just above described. The insecticide which is to be used may be placed within the container with the articles being treated before the opening is closed, or if desired, it may be placed within an insecticide holder shown in the other forms of the apparatus, hereinafter described, When the vacuum cleaner is now operated, it is obvious that the air contained within the container and hose will be circulated through the container, connector 13, hose 17, vacuum cleaner 15, hose 19, connector 14, and back to the container. Such recirculation will be continuous during the entire period of the fumigation, and it will be clear that each time the air comes in contact with the insecticide, it becomes more thoroughly charged with the fumes, vapors, or gases of such insecticide until it becomes completely saturated. Such saturated air is continuously and repeatedly drawn over, around, and through the articles being treated for a length of time which will depend upon the number of articles being treated, the texture of such articles, and the nature of the insecticide used. The fumigation, however, because of the continuous passage of the same saturated air through the container is accomplished in a relatively short time.

If desired, all surplus air may be expelled from the container before the treatment is started by forcing its walls into contact with the articles being treated, thereby making the treating air more concentrated.

Figure 2:
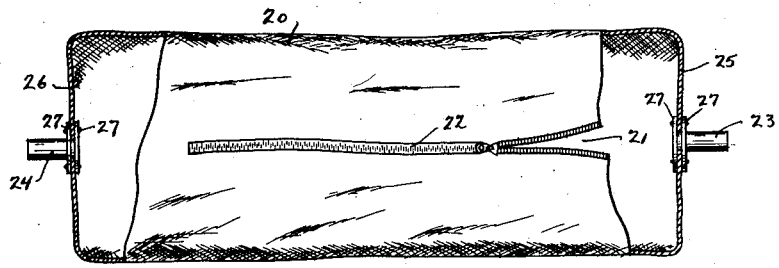
Fig. 2 is a side elevation partly in section of a container similar to that shown in Fig. 1.

The container 20 shown in the modified structure of Fig. 2 is similar to the container 10 shown in Fig. 1. The opening 21 of this form extends preferably for a distance equal to substantially the full length of the container and a hookless fastener 22 is employed. The connectors 23 and 24 are preferably secured to the ends 25 and 26, respectively, of the body by means of plates 27, arranged one at each side of the head and secured together and to the material forming the body by means of rivets, screws or other suitable fastening devices.

Figure 3:
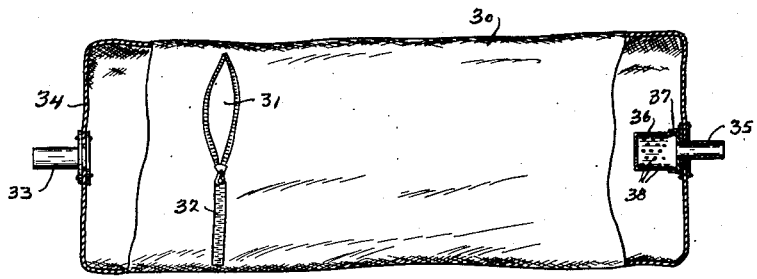
Figs. 3 and 4 are similar views of modified forms of container.

The form of apparatus shown in Fig. 3 comprises a container 30 having an opening 31 which extends laterally of the length of the device. This opening is closed preferably by means of a hookless fastener 32. A connector 33 is arranged at one end of the container and is attached to the head 34 in the manner above described. A connector 35 is arranged preferably at the opposite end of the container and carried by this connector is an insecticide holder 36. This holder may be secured to the connector by means of screw-threads 37, and may be provided with perforations 38. The insecticide, if in the form of crystals, may be placed within this insecticide holder, or if liquids are being used, suitable absorbent material is placed within the holder.

Figure 4:
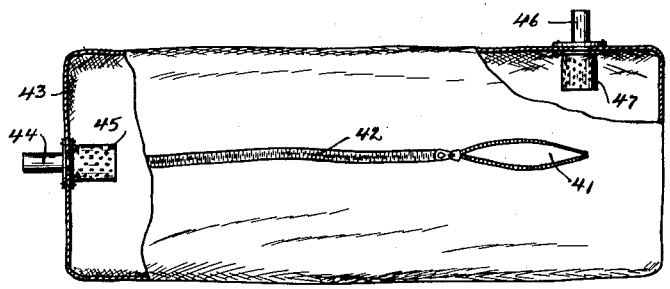

In Fig. 4 I show a container 40 having an opening 41 extending preferably the full length of the container and closed by means of a hookless fastener 42. This form of device may be provided in the end 43 with the connector 44 which carries at its inner end a suitable insecticide holder 45. Arranged at some place in the side of the container and preferably near the opposite end thereof is a connector 46. This connector also has an insecticide holder 47 secured to it and arranged within the container.

Figures 5, 6, 7:
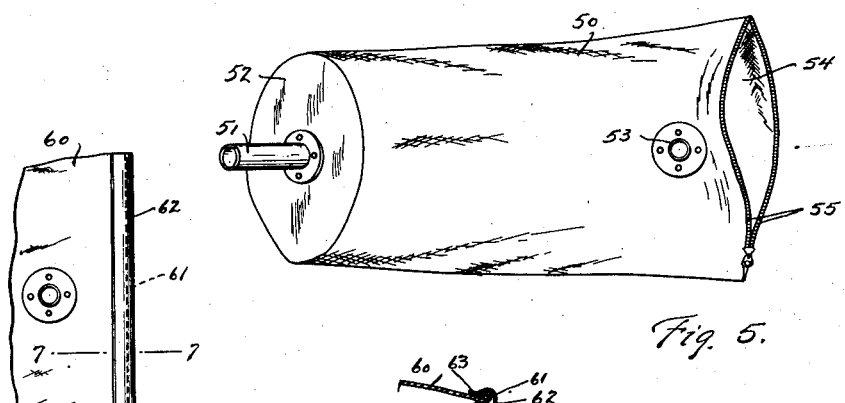
Fig. 5 is a perspective view of another form of container.
Fig. 6 is a fragmentary view of the form of container shown in Fig. 5 with a modified form of fastening means.
Fig. 7 is a fragmentary, sectional view taken on line 7—7 of Fig. 6.

The receptacle 50 of Fig. 5 is similar to the container 40 shown in Fig. 4 in that it has a connector 51 arranged in the end 52, and a connector 53 arranged in the side of the container. The opening 54 is preferably provided at the end of the container and may extend the full width thereof. The opening 54 may be closed by a hookless fastener 55.

In the modifications shown in Figs. 6 and 7, the container 60 is open at one of its ends in a manner similar to the form of Fig. 5 and each of the edges is provided with a bead 61 over which is slipped a clamping tube 62. This clamping tube is U-shaped in form and its mouth 63 is narrower than the recess formed in the body part. It is preferably made of resilient material and when slipped over the beads 61, serves to securely hold the edges of the container together, and thus close the opening formed between them.

Figure 8:
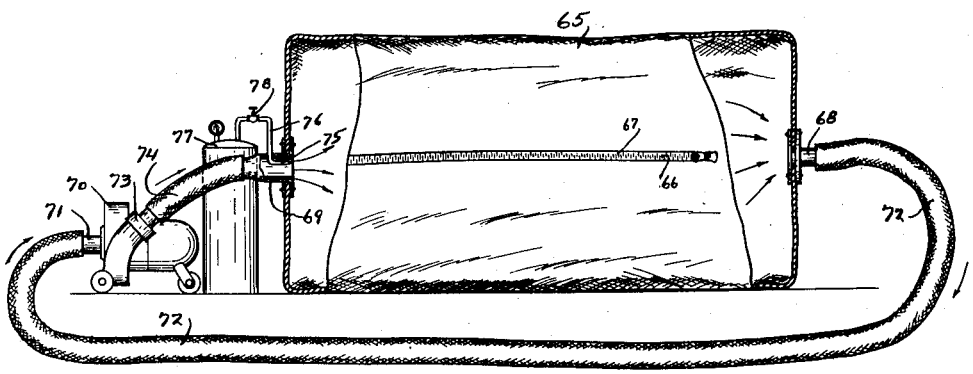
Fig. 8 shows another complete form of apparatus.

In Fig. 8 I show another modification of my invention. In this figure the container 65 is provided with a longitudinal opening 66 which is closed by means of a hookless fastener 67. A connector 68 is arranged at one end of the container and a connector 69 at the opposite end thereof. The vacuum cleaner 70 has its suction end 71 attached to the connector 68 by means of a hose 72. The outlet end 73 of the vacuum cleaner is attached to the connector 69 by means of a hose 74, whereby a complete circuit or path is provided for the passage of the air. This form of device is designed primarily to use an insecticide in the form of a gas or a liquid which quickly evaporates when coming in contact with air. To this end the connector 69 is provided with a nozzle 75 which may point inwardly toward the inside of the container. This nozzle is connected by means of a pipe 76 to a tank 77 containing suitable gas or liquid. A valve 78 is arranged in the pipe whereby the amount of gas or liquid entering the container can be regulated.

When the apparatus shown in Fig. 2 is to be used, the same steps are taken as in connection with the apparatus of Fig. 1. With the apparatus of Fig. 3, however, the insecticide is held by the insecticide holder 36. The blower side of the vacuum cleaner, or other suction device is attached to the connector 35, so that the air entering the container will be charged with the fumes, vapors, or gases of the insecticide used.

With reference to the form of device shown in Fig. 4, where two insecticide holders 45 and 47 are employed, the insecticide is preferably held by the insecticide holder which is at the pressure side of the vacuum cleaner, and if the use of additional insecticide is desired, such additional chemicals may be held by the other insecticide holder. If desired, however, the insecticide holder on the suction side of the device may be filled with a filter medium, so that the air is filtered in its passage from the container to the vacuum cleaner.

When the apparatus shown in Fig. 8 is used, the articles are placed within the container 65, as hereinbefore described, and the opening closed by means of the hookless fastener 67. The vacuum cleaner is then started and air is caused to circulate through the container, vacuum cleaner and connecting hose. Insecticide which is contained within the tank 77 is now allowed to enter the connector 69 by opening the valve 78. Sufficient insecticide is permitted to enter the container until the amount required for efficient mothproofing, fumigating and disinfecting has been reached at which time the valve 78 is closed. The charged or saturated air is then recirculated in continuous manner through, around, and over the articles being treated.

In using my apparatus any suitable insecticide may be used and will depend largely upon whether the articles are being treated for moths, or whether they are being fumigated and disinfected. The insecticide may be in lump or crystal form, or it may be in the form of gas or liquid. When mothproofing, I have found that naphthalene or paradichlorobenzene which may be had in crystal form are very well suited for the purpose. When it is desired to use a gas, my apparatus is well adapted to the use of, for instance, hydrocyanic-acid gas and for such use the form of apparatus shown in Fig. 8 is very suitable. Furthermore, sulphur fumes or liquids which when exposed to the air quickly evaporate, such as carbon disulphide or carbon tetrachloride, may be used. Obviously my apparatus is well adapted to carry out my process with gases or liquid chemicals which are disagreeable or relatively dangerous to use, since my invention is carried out in an enclosed apparatus and the air saturated with gas, fumes or vapors is recirculated within this enclosed apparatus and passed in, around, and through the articles being treated without exposure to the atmosphere.

While I have shown a household vacuum cleaner in connection with the containers, it is obvious that my apparatus may be made of any size suitable, for instance, for mothproofing or disinfecting furniture or the like, or for fumigating and disinfecting bedding in hospitals or hotels. Likewise, it may be used for treating furs held in storage.

Having thus described my invention, what I claim is:

1. Means for treating articles, comprising a closed, flexible container provided with an opening through which articles to be treated may be inserted, means for closing the opening, connectors carried by the container and arranged at points remote from each other, and means located outside of the container and attached to the connectors for causing a recirculation of air through the container.

2. Means for treating articles, comprising a closed, flexible container provided with an opening through which articles to be treated may be inserted, means for closing the opening, connectors carried by the container and arranged at points remote from each other, means in communication with the container for charging the air with an insecticide, and means located outside the container and attached to the connectors for causing a recirculation of air through the container.

3. Means for treating articles, comprising a closed, flexible container provided with an opening through which articles to be treated may be inserted, means for closing the opening, disinfecting means in communication with the container for charging the air, and means located outside the container and in communication therewith at points separated from each other, for causing a re-circulation of such charged air within the container.

In testimony whereof, I have hereunto signed my name.

ABRAHAM N. SPANEL.